(12) United States Patent
Kienzler et al.

(10) Patent No.: US 10,948,575 B2
(45) Date of Patent: Mar. 16, 2021

(54) OPTOELECTRONIC SENSOR AND METHOD OF MEASURING THE DISTANCE FROM AN OBJECT

(71) Applicant: SICK AG, Waldkirch (DE)

(72) Inventors: Stefan Kienzler, Waldkirch (DE); Martin Köhl, Waldkirch (DE); Kai Waslowski, Waldkirch (DE); Ulrich Zwölfer, Waldkirch (DE); Christophe Thil, Waldkirch (DE)

(73) Assignee: SICK AG, Waldkirch (DE)

( * ) Notice: Subject to any disclaimer, the term of this patent is extended or adjusted under 35 U.S.C. 154(b) by 360 days.

(21) Appl. No.: 16/013,313

(22) Filed: Jun. 20, 2018

(65) Prior Publication Data

US 2018/0372849 A1 Dec. 27, 2018

(30) Foreign Application Priority Data

Jun. 21, 2017 (DE) .................... 102017113674.6

(51) Int. Cl.
*G01S 7/4863* (2020.01)
*G01S 17/10* (2020.01)
*G01S 7/4865* (2020.01)
*G01S 7/487* (2006.01)
*G01S 7/497* (2006.01)
*G01S 17/18* (2020.01)
*G01S 17/894* (2020.01)

(52) U.S. Cl.
CPC ............ *G01S 7/4863* (2013.01); *G01S 7/487* (2013.01); *G01S 7/4865* (2013.01); *G01S 17/10* (2013.01); *G01S 7/497* (2013.01); *G01S 17/18* (2020.01); *G01S 17/894* (2020.01)

(58) Field of Classification Search
CPC .......... G01S 17/00; G01S 17/10; G01S 17/18; G01S 7/4865; G01S 17/4866; G01C 3/00
See application file for complete search history.

(56) References Cited

U.S. PATENT DOCUMENTS

2016/0033644 A1 2/2016 Moore
2018/0321363 A1* 11/2018 Beer ..................... G01S 17/10

FOREIGN PATENT DOCUMENTS

DE 102007013714 A1 10/2008

OTHER PUBLICATIONS

Beer, Maik, et al.; "Dead Time Effects in the Indirect Time-of-Flight Measurement with SPADs"; Fraunhofer Institute for Microelectronic Circuits and Systems.

(Continued)

*Primary Examiner* — Luke D Ratcliffe
(74) *Attorney, Agent, or Firm* — Nath, Goldberg & Meyer; Jerald L. Meyer

(57) ABSTRACT

An optoelectronic sensor is provided for measuring the distance from an object in a monitored zone that has a light transmitter for transmitting light signals into the monitored zone; a light receiver having at least one avalanche photodiode operated in Geiger mode for receiving the light signals reflected or remitted by the object; an individual time of flight measurement unit for determining an individual time of flight of a light signal from the sensor to the object; and an evaluation unit that is configured to generate a common measured value for the distance from a plurality of individual times of flight.

18 Claims, 2 Drawing Sheets

(56) References Cited

OTHER PUBLICATIONS

Luu, et al. "Saturation effects in heterodyne detection with Geiger-mode InGaAs avalanche photodiode detector arrays"; Applied Optics; vol. 45, No. 16; Jun. 1, 2006.
Milstein, et al. "Acquisition Algorithm for direct-detection ladars with Geiger-mode avalanche photodiodes"; Applied Optics; vol. 47, No. 2; Jan. 10, 2008.
German Search Report dated Mar. 14, 2018 corresponding to application No. 102017113674.6.

* cited by examiner

OPTOELECTRONIC SENSOR AND METHOD OF MEASURING THE DISTANCE FROM AN OBJECT

FIELD

The invention relates to an optoelectronic sensor and to a method of determining the distance from an object in a monitored zone that has a light transmitter for transmitting light signals into the monitored zone; a light receiver having at least one avalanche photodiode operated in Geiger mode for receiving the light signals reflected or remitted by the object; an individual time of flight measurement unit for determining an individual time of flight of a light signal from the sensor to the object; and an evaluation unit that is configured to determine a common measured value for the distance from a plurality of individual times of flight. The invention further relates to a method of measuring the distance from an object in a monitored zone in which a light signal is transmitted into the monitored zone; the light signal reflected or remitted by the object is received again by at least one avalanche photodiode of a light receiver operated in Geiger mode; individual times of flight of the light signal from the object are measured; and a common measured value for the distance is determined from a plurality of individual times of flight.

BACKGROUND

In a distance-measuring optoelectronic sensor, a distance from an object is determined beyond the pure object detection. Three-dimensional images or so-called depth maps are also detected with the aid of the distance information if the sensor is spatially resolving. A scanner scans the monitored zone by a light beam for this purpose, while a 3D camera also determines a piece of distance information for each of its pixels instead of or in addition to the brightness information. In this respect, the pixels can also respectively have a plurality of light sensitive elements that together contribute to a distance value.

A conventional method of distance measurement is the time of flight measurement. In this respect, a brief light pulse is transmitted and the time up to the reception of a remission or reflection of the light pulse is measured. It is, for example, known from DE 10 2007 013 714 A1 in order to gain higher robustness with respect to interference events and noise effects to transmit a plurality of individual light pulses sequentially, to collect the received signals thereupon generated in a histogram, and to subsequently evaluate them together, for instance via a search for a maximum in the histogram from which the received point in time is derived.

Such histogram evaluations require a large amount of memory since the total time of flight to be expected in the measurement range is divided into bins whose widths are at least close to the desired measurement resolution. If the distance measurement should be spatially resolving, as in a 3D camera, this memory requirement also scales with the number of pixels or the detection time very considerably increases to avoid the increased memory requirement by a sequential processing of the pixels. This is in particular an obstacle for the development of inexpensive integrated evaluation modules, for instance in the form of an ASIC (application specific integrated circuit). The large number of memory cells in the explained counting process via histograms determines the area and also limits the speed.

The detection sensitivity of simple photodiodes is not sufficient in a number of application cases. In an avalanche photodiode (APD), the incident light triggers a controlled avalanche effect. The charge carriers generated by incident photons are thus multiplied and a photocurrent is produced that is proportional to the received light intensity, but that is in this respect substantially larger than with a simple PIN diode. In the so-called Geiger mode, the avalanche photodiode is biased above the avalanche voltage such that a single charge carrier released by a single photon can already trigger an avalanche that then recruits all the available charge carriers due to the high field strength. The avalanche photodiode thus, like the eponymous Geiger counter, counts individual events. Geiger-mode avalanche photodiodes are also called SPADs (single photon avalanche diodes).

The high sensitivity of the SPADs also brings along disadvantages since a single interfering photon or an internal noise event already delivers the same signal as a pronounced wanted signal in a borderline case. In addition, the SPAD is subsequently not addressable for a specific dead time, with this dead time having the actual meaning over the short time scales that a SPAD is only available again on a measurement repeat. The conventional methods of time of flight measurement do not consider these special features of SPADs. They can admittedly therefore be transferred to SPAD light receivers, but improvement potential by SPADs remains unused in this respect.

SUMMARY

This object is satisfied by an optoelectronic sensor and by a method of measuring the distance from an object in a monitored zone in accordance with the respective independent claim. Light signals are transmitted by a light transmitter, are received in a light receiver again after reflection or remission at an object, and the individual time of flight is determined. The light receiver has at least one avalanche photodiode operated in Geiger mode or a SPAD. To obtain a reliable measured distance value, a plurality of individual times of flight from the sensor to the object are measured and a common measured value is determined therefrom. Strictly speaking, an individual time of flight is determined for the outward path and for the return path. The statistics are acquired over time and/or location, that is by measurement repeats using a plurality of sequential individual light pulses or in that the light receiver has a plurality of avalanche photodiodes in Geiger mode.

The invention starts from the basic idea of modeling the particular statistical behavior of SPADs with measurement and background events. In this respect, measurement incidents are caused by photons of the light signal, whereas background events are all the other triggers of an avalanche such as dark noise or extraneous light reception. The sought evaluation result is the exact received point in time $t_s$ from which, with the aid of a reference point in time, the time of flight then results and, via the speed of light while taking account of the forward path and the return path, the distance. The actual received point time $t_s$ is meant by this that corresponds to the distance of the object and not that of an individual light signal on an individual avalanche photodiode that only represents an individual measurement suffering from measurement errors or possibly corresponding to a background event.

This received point in time $t_s$ is sought in accordance with the invention in a predefined time interval $[t_0, t_1]$ that is, for example, a point in time corresponding to a measurement period between two transmitted light signals or from one transmitted point in time up to a maximum range or is a part interval of the measurement period. The model from which the determination of the received point in time $t_s$ is derived is based on the number $N(t)$ of the avalanche photodiodes still available at a respective point in time t. They are those avalanche photodiodes that are not already in their dead times due to a measurement event or background event. The model thus takes account of the special nature of avalanche photodiodes in Geiger mode or of SPADs. It must be noted that the number $N(t)$ can also include measurement repeats. It is irrelevant to the statistics underlying the common measured value whether an individual time of flight originates from the same measurement having different avalanche photodiodes or from a measurement repeat. The maximum initial number of available avalanche photodiodes therefore in particular in no way has to be determined directly by the number of physically present avalanche photodiodes. In other words, the total pool of available avalanche photodiodes by n measurements is n times as large. All the avalanche photodiodes present also do not necessarily have to be available in only one measurement because they are possibly not included in the measurement by parameterization, defect or the like.

The invention has the advantage that a time of flight and thus the distance from an object can be determined particularly precisely and with a particularly small effort. The model does not necessarily only take account of the special nature of avalanche photodiodes in Geiger mode or SPADs, but rather even exploits their properties in a constructive aspect to determine an exact received point in time $t_s$. Since in particular the background can be included, the evaluation is also very robust toward interference such as strong extraneous light or high dark noise and is thus especially suitable for demanding industrial applications.

The evaluation unit is preferably configured to determine the received point in time $t_s$ with the aid of a background parameter $\lambda$. The background for the model is thus detected and is taken into account therein. It can be assumed that a constant proportion of the avalanche photodiodes is triggered by a background event at any point in time. An exponential decay of $N(t)$ accordingly solely results on the basis of background. The background parameter $\lambda$ is then the time constant of an exponential function. It can, however, also be a value that equivalently or approximately describes the background.

The evaluation unit is preferably configured to determine the background parameter $\lambda$ from a measurement of individual times of flight. One possibility for this is a measurement with an inactive light transmitter, i.e. without transmission light signals so that the light receiver only registers background. Alternatively, a part region of a measurement period with a transmitted light signal can also be used in which no measurement events occur such as initially in particular by an artificial delay of the transmitted point in time. It is also possible using methods of order statistics to determine the background parameter $\lambda$ from individual times of flight with a measurement event. Finally, the background parameter $\lambda$ can be simply predefined, either as a fixed parameter or as the result of a measurement from a different source.

The evaluation unit is preferably configured to determine the received point in time with the aid of a signal strength parameter p. It is a dimension-less parameter that depends on the intensity of the remitted light signal. The greater the incidence of light, the more measurement events are triggered, which then produces a strong measured signal in sum. Accordingly, after a strong measured signal, the number $N(t)$ also drops more, which the model includes by the signal strength parameter p.

A plurality of avalanches are preferably triggered at the received point in time $t_s$ in the model n accordance with a Dirac pulse $\delta(t-t_s)$. The received signal is therefore modeled as an infinitesimally short pulse. This does not completely correspond to reality, but at least very short transmitted pulses are customary and possible. A Dirac pulse from triggering avalanche photodiodes results in an abrupt reduction in the number $N(t)$ of available avalanche photodiodes in accordance with the Heaviside function $\Theta$, weighted by the signal strength parameter p. Other functions such as a Gaussian pulse are conceivable, but at least require an additional parameter for describing the pulse shape and the evaluation is therefore not performable with the same simplicity.

In the model, the number $N(t)$ of the avalanche photodiodes still available at a respective point in time is described in accordance with the equation $N(t)=N(t_0) e^{-\lambda(t-t_0)-p\Theta(t-t_s)}$ with the background parameter $\lambda$ and the signal strength parameter p. This is the solution of a differential equation that describes the instantaneous change $$\frac{dN}{dt}$$

of the number or still available avalanche photodiodes $N(t)$ in dependence on the background parameter $\lambda$, on the signal strength parameter p, and on the received point in time $t_s$.

The evaluation unit is preferably configured to determine the signal strength parameter p from the number of still available avalanche photodiodes at the lower time boundary $t_0$ and at the upper time boundary $t_1$. Avalanche photodiodes that were still available at the start of the time interval and are no longer available at the end have registered either a measurement event or a background event. The background can be detected by the background parameter $\lambda$. The remaining difference is therefore the result of measurement events and is therefore suitable to determine the signal strength parameter p.

The evaluation unit is preferably configured to determine the signal strength parameter p in accordance with the equation $$e^{-p} = \frac{N(t_1)}{\alpha N(t_0)},$$

where $\alpha = e^{-\lambda(t_1-t_0)}$ with the background parameter $\lambda$. The signal strength parameter p is thus determined simply and fast by a closed expression.

The evaluation unit is preferably configured to sequentially determine first a background parameter $\lambda$, then, with the aid of a background parameter $\lambda$, a signal strength parameter p, and then, with the aid of the background parameter $\lambda$ and the signal strength parameter p, the received point in time $t_s$. Such a sequential determination of all the required parameters for the determination of the received point in time $t_s$ is preferably possible without approximations or an iterative process using the model in accordance with the invention. The procedure in accordance with the invention is considerably more robust and simultaneously less laborious than a simultaneous estimate or calculation of a plurality of parameters due to this sequential determination and to the absence of iterative procedures.

The evaluation unit is preferably configured to calculate the received point in time with the help of an analytical formula from the number of still available avalanche photodiodes N(t) at a point in time t, in particular the still available avalanche photodiodes at the point in time $t=t_0$ of the lower time boundary $t_0$, a background parameter $\lambda$, a signal strength parameter p, and a further parameter. A closed expression can be given for the received point in time $t_s$ that can be very easily evaluated. The evaluation unit preferably calculates numerically, not analytically, but with the specification for the numerical calculation being an analytical formula. An alternative procedure such as an iterative evaluation is conceivable, but not required.

The point in time t together with the associated number N(t) of still available avalanche photodiodes that enters into the calculation can be displaced by calculation, with knowledge of the background parameter $\lambda$, in the time range before the received point in time $t_s$ and is therefore freely selectable to this extent. The total number N(0) of avalanche photodiodes available in total and known in advance can in particular thus be adapted by calculation to a point in time t. Alternatively, this number N(t) of still available avalanche photodiodes can be determined, also without knowledge of the background parameter, by counting the total number of events prior to the point in time t and by subtracting the result from N(0).

In addition to the preferably selected values $t_0$, $t_1$, $N(t_0)$, $N(t_1)$, and $\lambda$, yet another parameter is required to determine the common measured value $t_s$ because the model would otherwise be underconstrained. However, in particular no knowledge of N(t) in the interior of $[t_0, t_1]$ is necessary if a suitable further parameter is selected.

The further parameter is preferably a mean value $\mu$ of the individual times of flight in the predefinable time interval $[t_0, t_1]$. The evaluation unit can very simply determine this mean value $\mu$, and indeed also on the fly without having to remember individual times of flight. Unlike a conventional histogram evaluation, substantial memory resources or bandwidth resources for providing the histogram data can thereby be saved.

The evaluation unit is preferably configured to calculate the received point in time $t_s$ as $$t_s = \left(-\frac{1}{\lambda}\right)\left[\ln\left(\frac{e^{\lambda t_1 + p}(\mu\lambda + N_0) - N_0(1 + \lambda t_1)}{N_0(e^p - 1)}\right) - \lambda t_1\right],$$

where $N_0 = N(t_0)$. The received point in time can be calculated very fast with few parameters due to this equation. In this respect, the measurement resolution is not restricted by the evaluation, for example as conventionally to a bin width of a histogram. Calculation facilitations for non-linear functions through look-up tables or approximations are conceivable.

The evaluation unit is preferably configured to localize or refine a predefinable time interval in advance that is shorter than a measurement period. The more precisely the time interval limits the received point in time $t_s$ from the start, the more precise the common measured value becomes. In a naïve, ideal observation, the time interval is not important. In a real measurement, however, the noise influences have the result that too large a time interval does not yet necessarily deliver the desired accuracy. The time interval can be localized by a pre-evaluation, for example by a threshold evaluation that roughly localizes a maximum of measurement events in time. This pre-evaluation becomes more precise when no rigid threshold is used, but it is rather estimated how many individual times of flight are to be expected in a time interval on the basis of background events, with an exponentially decaying frequency of background events being assumed and a time interval then being determined in which there are significantly more individual times of flight than expected.

The light receiver preferably has a plurality of avalanche photodiodes operated in Geiger mode and a plurality of individual time of flight measurement units (also known as time of flight of light measurement units) that are associated with the avalanche photodiodes individually or group-wise and that in particular have at least one TDC. As already explained, the invention is also usable in the case of only one avalanche photodiode and consequently of only one individual time of flight measurement unit since the number N(t) of available avalanche photodiodes is then also by no means restricted to one. In principle, the number of physically present avalanche photodiodes and the measurement duration or the number of measurement repeats can be swapped with one another for the statistics, at least in a total period of time of the measurement in which the scenery remains more or less static.

The avalanche photodiodes are here preferably arranged in linear form or in matrix form. There are then various variants of interconnection. The avalanche photodiodes can deliver a common measured value overall. It is, however, also possible to obtain a spatial resolution in that a plurality of avalanche photodiodes each determine a respective measured value as a group. This then produces a 3D image sensor whose effective spatial resolution corresponds to the number of groups, with the group size enabling an exchange relationship of spatial resolution, accuracy, and measurement duration of the distance determination. In this respect, individual times of flight are selectively measured for each avalanche photodiode or only together for a plurality of avalanche photodiodes. The individual time of flight measurement units can be fixedly or variably associated with specific avalanche photodiodes.

The individual time of flight measurement units preferably have a TDC (time-to-digital converter). It is a known and relatively simple module that can determine individual times of flight with a high temporal resolution. The TDC is preferably started at the transmitted point in time and is stopped by the received light pulse at the received point in time. Other operating modes are conceivable, for instance starting the TDCs in each case on the triggering of an avalanche and then stopping them at a known point in time, for instance at the end of the measurement period.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in.

DETAILED DESCRIPTION

Figure 1:
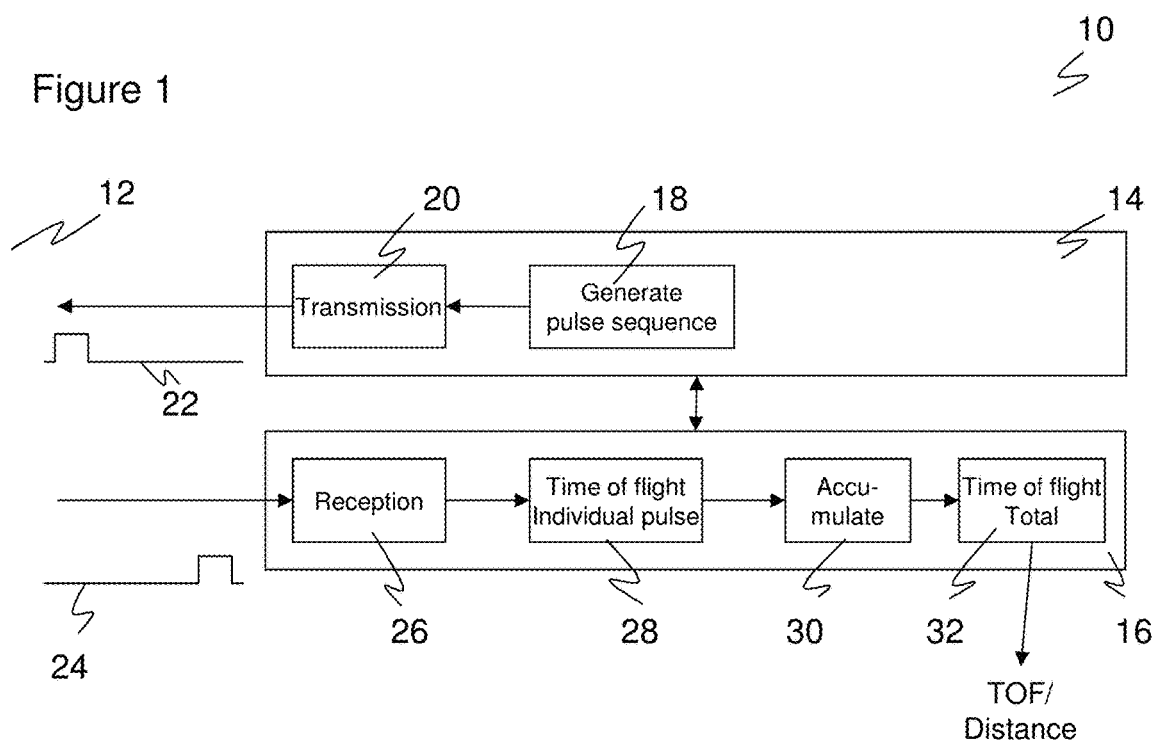
FIG. 1 a block diagram of a measurement core for determining the time of flight from a sequence of individual light pulses.

FIG. 1 shows a simplified block diagram of a sensor 10 for determining the distance from an object in a monitored zone 12 by measuring times of flight. The sensor 10 is divided into an upper transmission path 14 and a lower reception path 16 in FIG. 1. This division is not intended to imply any technical properties. The invention primarily relates to the reception path 16 so that any known implementation is conceivable for the transmission path 14. The elements of the transmission path 14 can be separate modules, but can also be integrated on a common module with the elements of the reception path 16.

Light signals are generated in the transmission path 14, preferably short individual pulses by a pulse generator 18. The term individual pulse relates to an individual measurement, in contrast to a total measurement, not to the pulse shape. The pulse shapes, pulse breaks, and pulse lengths can rather be varied, for example for a coding or for an adaptation to environmental conditions. However, for the interests of the invention, the simpler idea of a uniform sequence of individual pulses is sufficient that have a sufficient temporal spacing from one another so that the measurements do not influence one another. A light transmitter 20, for example an LED or a laser diode, generates corresponding individual light pulses 22 from the electronic transmitted signal that are transmitted into the monitored zone 12. If the individual light pulses 22 are incident on an object there, a corresponding reflected or remitted individual light pulse 24 returns to the sensor 10 and is incident on a light receiver 26 that generates an electronic received signal from it.

The light receiver 26 has avalanche photodiodes, not shown, in particular a large number of avalanche photodiodes in a linear or matrix arrangement. In this respect, a spatial resolution can be maintained and thus a 3D image sensor can arise, with a reduced spatial resolution being achievable with a more precise distance measurement by a common evaluation of a plurality of avalanche photodiodes. In an extreme case, all the avalanche photodiode elements are used for the determination of a common measured value. The avalanche photodiodes are operated, as already briefly described in the introduction, in Geiger model and are also called SPADs. The avalanche photodiodes or APDs are biased above their avalanche voltage and the avalanche flow can already be triggered by a single photon. SPADs are therefore extremely sensitive, but are at the same time also prone to incorrect measurements since a time of flight determined by a SPAD can erroneously be due to dark noise or to the registration of an extraneous light photon and can then be fully non-correlated with the distance of the object. In addition, an avalanche photodiode is no longer available for a dead time after an avalanche. The model approach in accordance with the invention for the determination of the time of flight is adapted to these properties of the SPADs.

As a first evaluation step, an individual time of flight measurement unit 28 determines the respective individual time of flight between the transmission of an individual light pulse 22 and the reception of the associated remitted individual light pulse 24. A plurality of individual time of flight measurement units 28 can be provided that are fixedly or dynamically associated with specific avalanche photodiodes or with groups thereof. For example, a block of TDCs (time-to-digital converters) is provided for this purpose, with the respective TDC being started on the transmission of an individual light pulse and being stopped by a signal generated by the avalanche in an associated avalanche photodiode. The mode of operation of the TDCs is not fixed; for example, a different possible mode of operation is the so-called common stop mode in which the signal of the avalanche photodiode starts the respective TDC and all the TDCs are stopped together, for example at the end of a measurement period.

Further evaluation steps are only shown rudimentarily in FIG. 1 and will only be described more precisely further below with reference to FIGS. 3 and 4. Very roughly, individual times of flight are first collected in a memory 30. This can already be done in a combined manner, for example in a histogram having a bin width that is selected while taking account of the desired resolution and of the memory requirement; or certain statistical values such as the mean value, the mean value per bin, or the number of individual times of flight and the like are formed to avoid the accumulation of a histogram or at least of a finely resolved histogram in a directly continuing manner. The evaluation can be restricted to a partial region (region of interest, ROI) that corresponds, after pre-evaluations, to other prior knowledge or, on the basis of an assumption, to an environment of the distance to be measured. The individual times of flight and/or the values acquired therefrom, are then evaluated together in a measured value block 32 to ultimately acquire the distance from the object.

At least the reception path 16 is integrated on an ASIC in a preferred embodiment. In this respect, separate blocks can be provided for the light receivers 26, on the one hand, and for the evaluation circuits 28, 30, 32, on the other hand. However, at least the respective individual time of flight measurement unit 28 is preferably arranged directly at the light receiver 26 and in particular forms intelligent pixels or a pixel-proximate evaluation with individual avalanche diodes or groups thereof. The accumulator 30 and the measured value block 32 can also be integrated into these pixels. A higher ranking control then decides whether and how the measurement results of the pixels are used in a spatially resolved manner or are averaged again. In a further embodiment, an FPGA (field programmable gate array) and/or a microprocessor is/are used on which the accumulator 30 and/or the measured value block 32, and optionally also the individual time of flight measurement unit 28, is/are implemented.

FIG. 1 only shows the components of the optoelectronic sensor 10 relevant to the actual measurement. Further elements required in practice and known per se such as a transmission or reception optics have been omitted for reasons of a better overview. The sensor 10 can be a simple sensing device that measures the object distance on an axis and then, for example, outputs a continuous numerical value for the distance or the sensor 10 acts as a switch whose switching state changes depending on the presence or absence of an object in a predefinable distance range. The axis of the sensing device can be set into a rotary movement by a corresponding rotating mirror or as a measurement head rotating in total and then forms a scanner. A further exemplary embodiment of the sensor 10 is a 3D camera.

Figure 2:
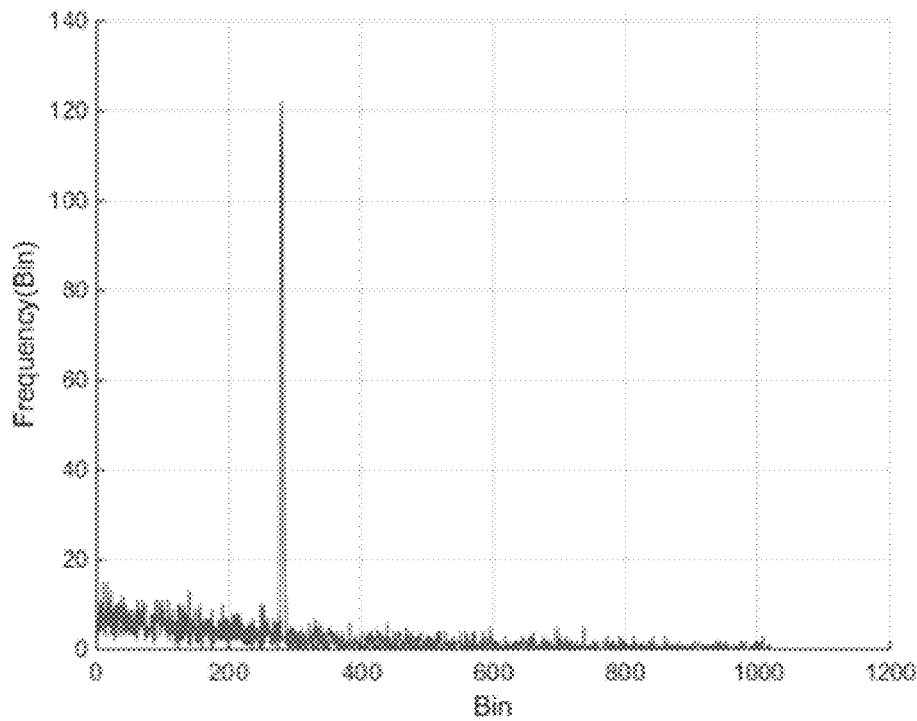
FIG. 2 an exemplary histogram of a plurality of times of flight measured with individual light pulses.

FIG. 2 shows an exemplary histogram of a plurality of individual times of flight for illustration. In this respect, the bins on the X axis are time intervals of possible times of flight, here in any desired units and in high resolution, i.e.

with a small bin width. The Y axis represents the associated number of detected individual times of flight. The histogram is therefore a distribution of the measured individual times of flight overall.

The histogram in this case shows a clear maximum that is recognized approximately in the 270th bin with the naked eye and that is clearly distinguished from the background of the individual times of flight caused by dark noise, extraneous light, and other interference effects. The maximum could be found using a threshold evaluation and the distance of the object could be determined therefrom. However, this requires considerable memory requirements for the high resolution histogram, particularly when it is imagined that such a histogram would have to be stored for every pixel in a 3D image sensor. In addition, the situation in FIG. 2 is very simple in that the maximum stands out very clearly from the background. This is in particular by no means the case in a real measurement, in particular with low-remitting objects or with objects that are far away.

A special evaluation that has as its basis a model of the distribution of individual times of flight of measurement events and background events that includes the special features of SPADs therefore takes place in accordance with the invention. This evaluation preferably also does not take place on the full, high resolution histogram that is primarily shown for better understanding. The histogram is rather preferably only detected with a comparatively poor resolution or only specific statistic values are determined at all and the individual times of flight themselves are discarded after their influence on these values has been evaluated. The evaluation can thus be carried out with considerably fewer resources such as memory, computing power, and bandwidth for data transmission.

This model-based evaluation will now be explained with reference to FIGS. 3 and 4. FIG. 3 shows an exemplary progression of the number of measurement events and background events in dependence on the time. This in principle corresponds to the histogram shown in FIG. 2. However, the distribution is shown continuously here and not discretely. It is additionally an idealized representation. There are admittedly background events, but no noise in the sense that the background events occur at a constant rate. This constant rate is superposed with the effect that an avalanche photodiode is in its dead time after triggering an avalanche and can therefore not be triggered again. The number of events therefore drops exponentially with time. There is a large number of measurement events and therefore a measurement peak around the received point in time $t_s$. Even fewer avalanche photodiodes are therefore subsequently abruptly available and the exponential drop due to background events in the remaining measurement period is continued at a correspondingly lower level.

Figure 4:
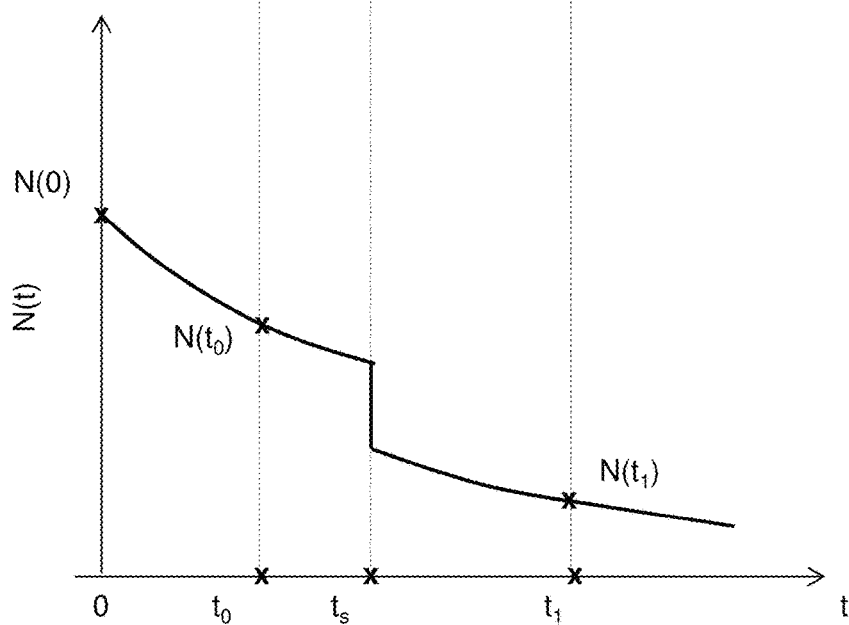
FIG. 4 a progression of the number of still available avalanche photodiodes in dependence on the time corresponding to FIG. 3.

FIG. 4 shows an associated time-dependent progression of the number of avalanche photodiodes N(t) still available that drops exponentially due to the background and reduces abruptly at the received point in time $t_s$. It is again pointed out, as already a multiple of times in the introduction, that the number of initially available avalanche photodiodes N(t) does not necessarily agree with the number of physically present avalanche photodiodes since there can be measurement repeats. It would therefore also be possible to speak of a number of possible events or of an event pool; however, the reference to still available avalanche photodiodes is maintained here with the term understanding just explained.

The behavior of the avalanche photodiodes during a measurement should now be detected mathematically. The time period observed overall and shown in FIGS. 3 and 4 is a measurement period that starts at a point in time t=0 at which the avalanche photodiodes are switched to active and consequently trigger an avalanche at measurement events or background events, for which purpose the individual time of flight measurement unit 28 determines corresponding times of flight. With a background event, this is naturally in actuality not a time of flight; however, the measurement cannot distinguish this, at least not in this stadium. The transmitted point in time is preferably likewise t=0; a shift that will be corrected later as a constant is, however, equally conceivable.

A time interval $[t_0, t_1]$ is selected or predefined within the measurement period and comprises the measurement peak and thus the received point in time $t_s$ to be determined. A plurality of measurement peaks can occur in a measurement period, for example with semi-transparent objects or edge impingements. However, only one measurement peak should occur in the time interval $[t_0, t_1]$; otherwise the result is an intermediate value of the location of a plurality of measurement peaks. The time interval $[t_0, t_1]$ can be limited by prior evaluation or by an earlier measurement. In an idealized observation with a constant background rate, the time interval $[t_0, t_1]$ would not be decisive for the accuracy of the measurement; the result would be independent thereof. In practice, however, the result becomes more accurate with a finer time interval $[t_0, t_1]$ with individual times of flight suffering from noise.

$t_0=0$ is later chosen for the lower boundary without restricting the general applicability. The following mathematical expressions can be represented in a more compact and clear form by this shift of the time axis to $t_0=0$. This zero time point may not be confused with the start of the measurement period, although an identical is also not precluded. Strictly speaking, the fine time of flight portion within the time interval $[t_0, t_1]$ is therefore determined to which then the original $t_0$ can simply be further added.

In this time interval $[t_0, t_1]$, the event pool or the number of still available avalanche photodiodes N(t) is looked at. It is assumed that an avalanche photodiode in which an avalanche has been triggered once no longer recovers within the measurement period, at least not within the time interval. Otherwise, a recovery rate could be taken into account or it is implicitly already co-determined by the background parameter λ.

Two parameters are first introduced to describe the time behavior N(t). This is a background parameter λ, on the one hand, that detects the reduction of N(t) by background events. As can be recognized in FIGS. 2 to 4 and as will directly be found again, background events result in an exponential decay of N(t) and the background parameter λ can therefore be understood as a time constant.

The background parameter λ can be determined in advance by a measurement. It can be ensured here that only background events occur and no measurement events, either in that no light signals at all are transmitted or the observation time period is set such that there are no measurement events therein. The background parameter λ can also be extracted from a measurement with measurement events using means of order statistics.

Figure 3:
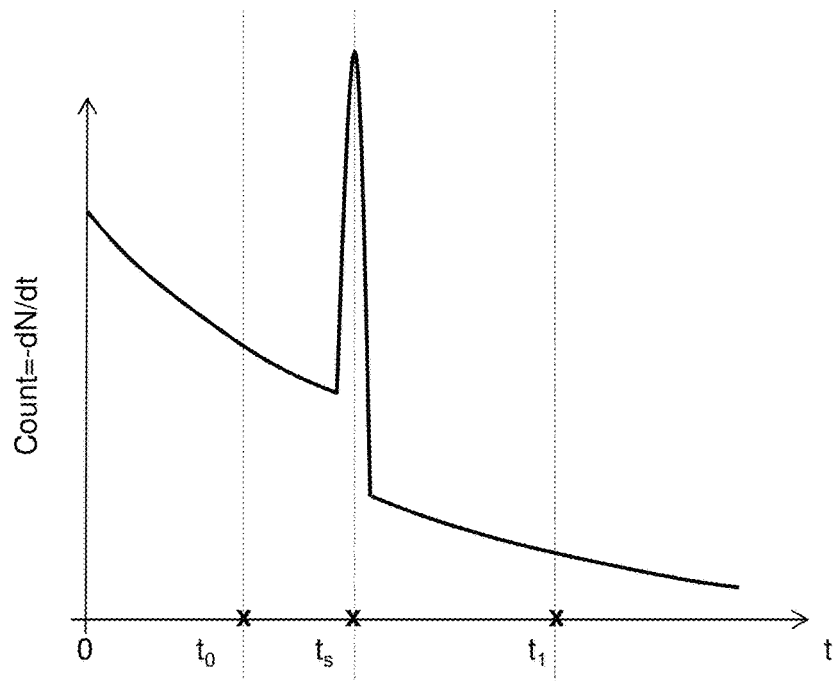
FIG. 3 an exemplary progression of the number of measurement events and background events in dependence on the time.

A second parameter p detects the strength of the signal pulse, that is graphically how strong the measurement peak in FIG. 3 is and thus how pronounced the abrupt decay of N(t) at the received point in time $t_s$ is in FIG. 4. The measurement peak is modeled as a Dirac pulse $\delta(t-t_s)$, weighted with the parameter p. A different pulse shape such as a Gaussian distribution would also be conceivable, but not only requires more complicated calculations, but rather additionally typically the description of the pulse by at least two parameters. This then in turn no longer allows any simple solution in which the parameters can be determined sequentially and thus particularly simply.

A system differential equation for N(t) can now be formulated using these parameters:

$$\frac{dN(t)}{dt} = -\lambda N(t) - pN(t)\delta(t - t_s).$$

The first term describes changes due to background events, the second term describes changes due to measurement events.

The solution of this differential equation describes the event pool or the number N(t) of still available avalanche photodiodes at the time t in dependence on the background parameter $\lambda$ and on the signal strength parameter p:

$$N(t) = N(t_0) e^{-\lambda(t-t_0) - p\Theta(t-t_s)}.$$

Up to now, the background parameter $\lambda$ is known, but not yet the signal strength parameter p. The numbers $N(t_0)$, $N(t_1)$ of still available avalanche photodiodes at the boundaries of the time interval $[t_0, t_1]$ are furthermore known. They can be determined by integration up to $t_0$ or from $t_1$ onward. Practically, histogram counts from a histogram as in FIG. 2 are added thereto or individual times of flight are counted on the fly in accordance with their locations with respect to the time interval $[t_0, t_1]$. Up to the point in time $t_s$ and thus at least up to the point in time $t_0$, N(t) and thus $N(t_0)$ can also be calculated with knowledge of the background parameter $\lambda$ and without knowledge of the signal strength parameter p from the above indicated solution for N(t).

Still assuming $\alpha := e^{-\lambda(t_1-t_0)}$, $t_1$):

$$N(t_1) = N(t_0)\alpha e^{-p} \text{ and thus } e^{-p} = \frac{N(t_1)}{\alpha N(t_0)}.$$

applies at the upper boundary in accordance with the solution N(t). This signal strength parameter p is consequently solely fixed by the marginal values of N(t) at the borders of the time interval $[t_0, t_1]$ and by the background parameter $\lambda$. Both parameters $\lambda$, p required up to now can therefore still be determined without knowledge of $t_s$.

As the last step, a closed expression should now also be found for the received point in time $t_s$ in an analytical manner. A further parameter is still required for this purpose since the model or the solution N(t) of the differential equation would otherwise remain underconstrained. The mean value $\mu$ of the individual times of flight in the time interval $[t_0, t_1]$ is used for this purpose.

The mean value $\mu$ can practically be estimated very easily. A check is made for the individual times of flight, in particular on the fly, whether they are in the time interval $[t_0, t_1]$. If this is the case, the individual time of flight is added to a sum and a counter is incremented, with the mean value $\mu$ then being the quotient of the sum and of the count.

Mathematically, in contrast, $$\mu = \int_{t_0}^{t_1} dt \left(\frac{-dN}{dt}\right) t$$

applies. Here, $$\frac{-dN}{dt}$$

corresponds to the time change in N(t) shown in FIG. 3 or even more graphically to the histogram shown in FIG. 2.

On the other hand, in accordance with the differential equation shown above together with the solution $$\frac{dN}{dt} = -\lambda N(t) - pN(t)\delta(t - t_s) = [N(t_0)e^{-\lambda(t-t_0)-p\Theta(t-t_s)}][-\lambda - p\delta(t-t_s)].$$

As already mentioned, $t_0 = 0$ can be selected without restriction of the general applicability. With $N_0 := N(t_0)$, the equation for the mean value and the equation just given become:

$$\mu = \int_0^{t_1} dt[-\lambda - p\delta(t-t_s)]N_0 e^{-\lambda t - p\Theta(t-t_s)} t.$$

$$\mu = \frac{N_0}{\lambda}[-1 + e^{-\lambda t_s} - e^{-\lambda t_s - p} + \lambda t_1 e^{-\lambda t_1 - p} + e^{-\lambda t_1 - p}]$$

results after evaluation of the integral.

The closed expression for $t_s(\mu, \lambda, N_0, p, t_1)$ then results from this:

$$t_s = \left(-\frac{1}{\lambda}\right)\left[\ln\left(\frac{e^{\lambda t_1 + p}(\mu\lambda + N_0) - N_0(1 + \lambda t_1)}{N_0(e^p - 1)}\right) - \lambda t_1\right].$$

$$d = \frac{ct_s}{2}$$

applies to the actual measured value, the distance d, due to double the light distance, with c corresponding in a very good approximation to the vacuum speed of light on a measurement in air and with a corresponding correction factor having to be used in a different medium.

The invention claimed is:

1. An optoelectronic sensor for measuring the distance from an object in a monitored zone, the optoelectronic sensor having a light transmitter for transmitting light signals into the monitored zone;

a light receiver having at least one avalanche photodiode operated in Geiger mode for receiving the light signals reflected or remitted by the object;

an individual time of flight measurement unit for determining an individual time of flight of a light signal from the sensor to the object; and an evaluation unit that is configured to determine a common measured value for the distance from a plurality of individual times of flight, wherein the evaluation unit is furthermore configured to determine a received point in time $t_s$ forming the basis of the common measured value in a predefinable time interval having a lower time boundary $t_0$ and an upper time boundary $t_1$ from a model of the number N(t) of the avalanche photodiodes still available at a respective point in time t, with an avalanche photodiode still being available as long as no avalanche has been triggered therein.

2. The sensor in accordance with claim 1, wherein the evaluation unit is configured to determine the received point in time $t_s$ with the aid of a background parameter $\lambda$.

3. The sensor in accordance with claim 2, wherein the evaluation unit is configured to determine the background parameter $\lambda$ from a measurement of single times of flight.

4. The sensor in accordance with claim 1, wherein the evaluation unit is configured to determine the received point in time with the aid of a signal strength parameter p.

5. The sensor in accordance with claim 1, wherein a plurality of avalanches are triggered in the model at the received point in time $t_s$ in accordance with a Dirac pulse $\delta(t-t_s)$.

6. The sensor in accordance with claim 5, wherein, in the model, the number N(t) of the avalanche photodiodes still available at a respective point in time is described in accordance with the equation $N(t)=N(t_0)e^{-\lambda(t-t_0)-p\Theta(t-t_s)}$ by the background parameter $\lambda$ and the signal strength parameter p.

7. The sensor in accordance with claim 1, wherein the evaluation unit is configured to determine the signal strength parameter p from the number of still available avalanche photodiodes at the lower time boundary $t_0$ and at the upper time boundary $t_1$.

8. The sensor in accordance with claim 1, wherein the evaluation unit is configured to determine the signal strength parameter p in accordance with the equation $$e^{-p} = \frac{N(t_1)}{\alpha N(t_0)},$$

where $\alpha = e^{-\lambda(t_1-t_e)}$ with the background parameter $\lambda$.

9. The sensor in accordance with claim 1, wherein the evaluation unit is configured to sequentially determine first a background parameter $\lambda$, then, with the aid of the background parameter $\lambda$, a signal strength parameter p, and then, with the aid of the background parameter $\lambda$ and a signal strength parameter p, the received point in time $t_s$.

10. The sensor in accordance with claim 1, wherein the evaluation unit is configured to calculate the received point in time with the help of an analytical formula from the number of still available avalanche photodiodes N(t) at a point in time t, in particular the still available avalanche photodiodes at the point in time $t=t_0$ of the lower time boundary $t_0$, a background parameter $\lambda$, a signal strength parameter p, and a further parameter.

11. The sensor in accordance with claim 10, wherein the evaluation unit is configured to calculate the received point in time with the help of the analytical formula from the number of the still available avalanche photodiodes at the point in time $t=t_0$ of the lower time boundary $t_0$.

12. The sensor in accordance with claim 10, wherein the further parameter is a mean value $\mu$ of the individual times of flight in the predefinable time interval.

13. The sensor in accordance with claim 12, wherein the evaluation unit is configured to calculate the received point in time $t_s$ as $$t_s = \left(-\frac{1}{\lambda}\right)\left[\ln\left(\frac{e^{\lambda t_1+p}(\mu\lambda+N_0)-N_0(1+\lambda t_1)}{N_0(e^p-1)}\right)-\lambda t_1\right]$$

where $N_0 = N(t_0)$.

14. The sensor in accordance with claim 1, wherein the evaluation unit is configured to localize or refine a predefinable time interval in advance that is shorter than a measurement period.

15. The sensor in accordance with claim 1, wherein the light receiver has a plurality of avalanche photodiodes operated in Geiger mode and a plurality of individual time of flight measurement units that are associated with the avalanche photodiodes individually or group-wise.

16. The sensor in accordance with claim 15, wherein plurality of individual time of flight measurement units have at least one time-to-digital converter (TDC).

17. A method of measuring the distance from an object in a monitored zone, the method comprising the steps of:
transmitting a light signal into the monitored zone;
receiving again the light signal reflected or remitted by the object by at least one avalanche photodiode of a light receiver operated in Geiger mode;
measuring individual times of flight of the light signal from the object; and
determining a common measured value for the distance from a plurality of individual times of flight, using an evaluation unit corresponding to an event pool or a number N(t) of still available avalanche photodiodes, wherein a received point in time $t_s$ forming the basis of the common measured value is determined in a predefinable time interval having a lower time boundary $t_0$ and an upper time boundary $t_1$ from a model of the number N(t) of the avalanche photodiodes still available at a respective point in time t, with an avalanche photodiode still being available as long as no avalanche has been triggered therein.

18. An optoelectronic sensor for measuring the distance from an object in a monitored zone, the optoelectronic sensor having
a light transmitter for transmitting light signals into the monitored zone;
a light receiver having at least one avalanche photodiode operated in Geiger mode for receiving the light signals reflected or remitted by the object;
an individual time of flight measurement unit for determining an individual time of flight of a light signal from the sensor to the object; and
an evaluation unit that is configured to determine a common measured value for the distance from a plurality of individual times of flight, corresponding to an event pool or a number N(t) of still available avalanche photodiodes,
wherein the evaluation unit is furthermore configured to determine a received point in time $t_s$ forming the basis of the common measured value in a predefinable time interval having a lower time boundary $t_0$ and an upper time boundary $t_1$ from a model of the number N(t) of the avalanche photodiodes still available at a respective point in time t, with an avalanche photodiode still being available as long as no avalanche has been triggered therein, and wherein the evaluation unit is configured to determine at least one of a time parameter or a signal strength parameter.

* * * * *